June 26, 1923.
J. MATTSON
MILLING MACHINE CUTTER
Filed Sept. 8, 1922
1,460,028
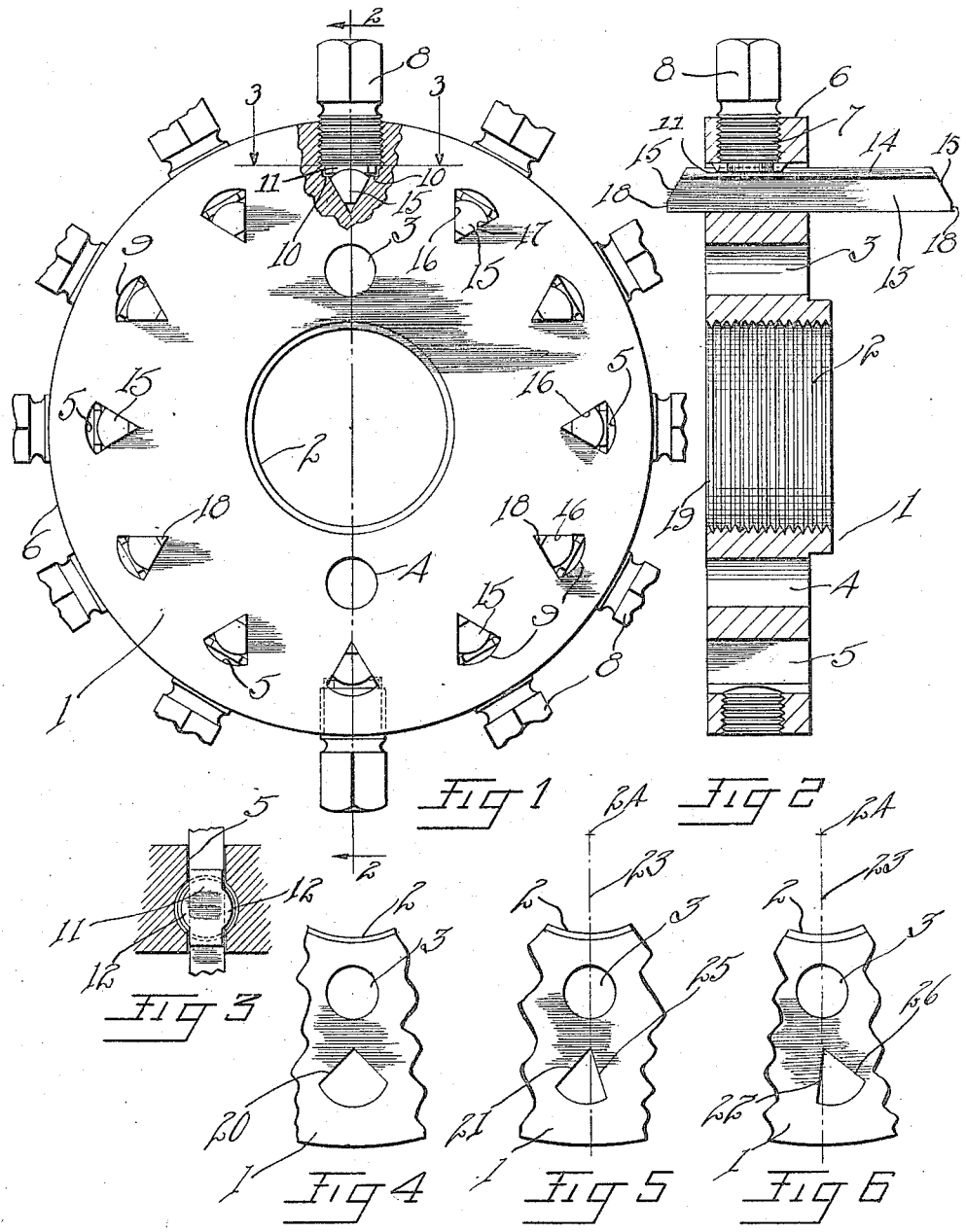
INVENTOR
Julius Mattson
BY
ATTORNEYS Patented June 26, 1923.

1,460,028

UNITED STATES PATENT OFFICE.

JULIUS MATTSON, OF CHICAGO, ILLINOIS.

MILLING-MACHINE CUTTER.

Application filed September 8, 1922. Serial No. 586,904.

*To all whom it may concern:*

Be it known that I, JULIUS MATTSON, a citizen of the United States, and a resident of Chicago, in the county of Cook and State of Illinois, have invented a new and useful Improvement in Milling-Machine Cutters, of which the following is a full, clear, and exact description.

My invention relates to improvements in milling machine cutters, and it consists in the combinations, constructions, and arrangements herein described and claimed.

An object of my invention is to provide a cutter of the character described for milling machines by means of which the speed in cutting may be increased without sacrificing a uniform smooth cut.

A further object of my invention is to provide a device of the character described in which means is provided for removably holding the cutting teeth securely in a predetermined position.

A further object of my invention is to provide a device of the character described in which the cutting teeth may be quickly and easily inserted and locked in an operative position, and which is extremely simple in construction and thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a front elevation of an embodiment of my invention,

Figure 2 is a sectional view along the line 2—2 of Figure 1,

Figure 3 is a sectional view along the line 3—3 of Figure 1,

Figure 4 is a fragmentary view of a modified portion of the tool plate shown in Figure 1, Figure 5 is another modification of the tool plate shown in Figure 1, and Figure 6 is another modification of the tool plate shown in Figure 1.

In carrying out my invention, I make use of a milling machine having a tool plate 1. The plate 1 is provided with a central bore 2 by means of which the plate may engage the threaded mandrel or spindle of the milling machine and be carried thereupon. Openings 3 and 4 are provided in the plate 1 for receiving a tool by means of which the plate may be removed from the mandrel or spindle. The plate 1 is provided with a plurality of openings 5 therethrough arranged in annular alinement and parallel with the peripheral wall 6 of the plate. The openings 5 are substantially the shape of a sector of a circle having its straight side walls approximately 60 degrees apart.

Each of the openings 5 which extends clear through the plate 1, has communicating therewith a threaded bore 7 in the outer wall of the plate. The bore 7 extends from the outer wall of the opening 5 to the wall 6 of the plate 1. Each of the bores 7 is provided with a threaded set screw 8 having a head adapted to be received by a wrench or the like.

The bore 7 of the plate 1 extends down slightly below the arcuate side wall 9 of the opening 5 so that shoulders 10 are formed at the junction point of the core 7 and the opening 5. Each of the openings 5 has therein a metal plate 11 substantially the shape of a disc having diametrically opposed angular extensions. This plate is clearly shown in Figure 3. The plate 11 is disposed so that its arcuate side portions 12 normally rest upon the shoulders 10, (see Figure 1). The bottom of the set screw 8 therefore normally rests upon the plate 11 and holds the plate in close engagement with the shoulders 10.

Each of the openings 5 is provided with a steel cutter 13, substantially the shape in cross section of the opening 5, yet allowing sufficient clearance for the top portion 14 to be received beneath the plate 11. The cutter 13 is fashioned alike at each of its ends. These ends are inclined as shown at 15, one edge 16 thereof comprising the cutting edge and the opposite edge 17 being disposed slightly in the rear of the edge 16. The points of the cutter 13 are blunt as shown at 18. One of the important advantages of my present invention is that the cutter 13 when inserted in the opening 5 and locked in place by means of the screw 8 bearing through the plate 11 thereupon, is firmly and positively held in a certain predetermined position, determined by the position of the straight walls of the opening 5 relative to the radial line drawn from the axis of the cutter plate through the apex of the opening 5.

From the foregoing description of the various parts of the device, the operation thereof may be readily understood. In my improved milling machine cutter, I insert the steel cutters 13 in the openings 5. When the cutters 13 are inserted, the plate 11 will be lifted from engagement with the shoulders 10. The cutters 13 are then adjusted so that all are disposed with their desired cutting edges closely adjacent the face 19 of the plate 1. This obviates a great deal of vibration that would otherwise produce rough work if the cutting edge were at any distance from the plate. The screw 8 is then tightened so that the plate 11 bears upon the face 14 of the cutter. This will force the cutter into close engagement with the inner portion of the openings 5 and positively lock the cutter against rotation or movement in the opening 5. The edges 16 of the cutters are then all at a predetermined angle from radial lines extending from the center of the cutter plate.

The cutter plate is then revolved and used in much the same manner as the ordinary type of milling machine cutter. If the cut is to be relatively light, it is not necessary to employ a blunt end, such as shown at 18. This blunt end is principally for use where it is desired to make a fast cut, yet a rough cut, as in deep facing.

In Figures 4, 5, and 6, I have shown modified forms of the openings 5 which are adapted to receive modified forms of cutter blades 13. The cutters 13 in each case, as shown in Figures 4, 5, and 6, are formed so as to closely fit and engage the openings 20, 21, and 22 shown in Figures 4, 5, and 6, respectively. In Figure 4 I have shown an opening 20 having its straight walls 90 degrees from one another. The cutter which fits this opening I choose to call a square cutter, since the cutting edge is 90 degrees from the opposite and rearwardly disposed edge of the cutter.

In Figure 5 I have shown an opening 21 having one of its straight side walls further away from a radial line 23 drawn from the center 24 of the plate 1 to the apex of the opening than its opposite straight wall. The purpose of the cutter which fits this opening is that the cutting edge 16 of the cutter will be parallel to the wall 25 of the opening 21 and at a slight inclination from the radial line 23. This slight inclination in the cutting edge is desirable for certain types of cutting well known in the art.

In Figure 6 I have shown an opening 22 having its straight walls disposed in exactly opposite relation to the radial line 23 than that shown and described in Figure 5. The purpose of this opening is to receive a cutter 13 so that its cutting edge will be parallel to the side 26 at a greater inclination from the radial line 23 than the normal position of the cutter edge as shown in Figure 1. This position of the cutter edge is to fulfill the requirement of another mode of cutting well known in the art.

These modified forms I deem as important modifications of my invention, since it should be well understood that the primary purpose of the invention is to provide a cutter for milling machine in which the cutting edges may be positively locked and held at a predetermined angle from the direction of movement of the cutter without entailing a great deal of work in setting as is required in the ordinary type of tool holder.

I claim:

1. A device of the character described comprising a cutter plate adapted to be carried by the spindle of a milling machine or the like, said plate being provided with an opening disposed transversely therethrough and a threaded bore extending outwardly from one wall of said opening to the peripheral wall of said plate, a threaded set screw adapted to be received in the threaded bore, a gripping plate disposed in said opening and in registration with the lower end of said threaded bore, and means for limiting the movement of said gripping plate in one direction and a cutting blade having a sectional contour corresponding with the side walls of said opening adapted to be received in said opening and locked in position by said set screw.

2. In a device of the character described, a cutter blade triangular in cross section, having two flat side walls disposed at a predetermined angle to one another, said blade being provided with a cutting edge and parallel with one of said side walls, and a cutter plate having a triangular opening transversely therethrough and arranged with two of its side walls at a predetermined angle to one another corresponding with the two flat side walls of said cutter blade and means for locking said cutter blade within said opening so that the flat side walls of said blade are in close engagement with the two said side walls of said opening, whereby said cutting edge may be at predetermined position relative to said plate.

JULIUS MATTSON.